Figure 1:
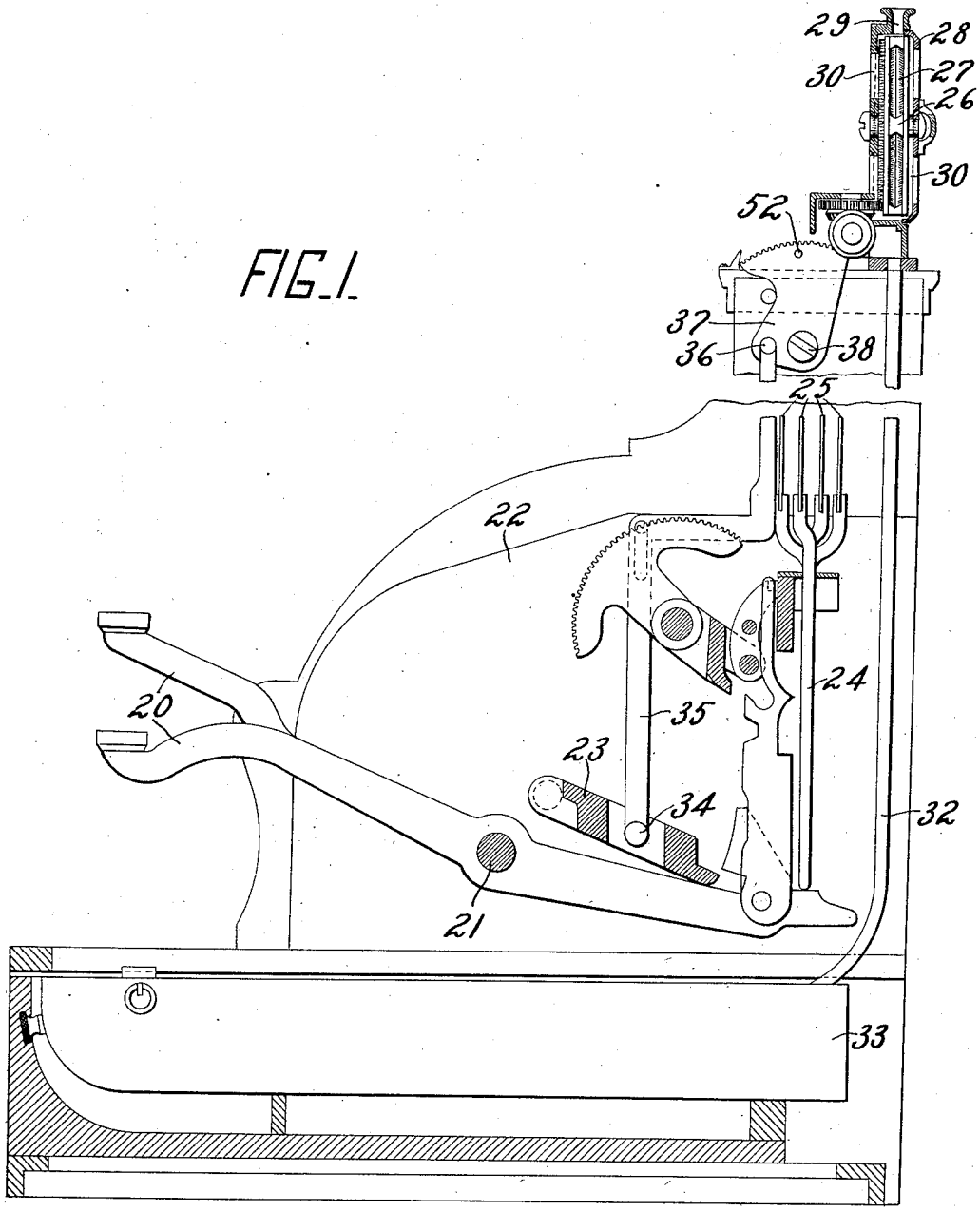

C. PALMER.
CASH REGISTER.
APPLICATION FILED MAR. 28, 1910.

1,046,011.

Patented Dec. 3, 1912.

3 SHEETS—SHEET 1.

WITNESSES:

INVENTOR
Charles Palmer
BY
ATTORNEYS

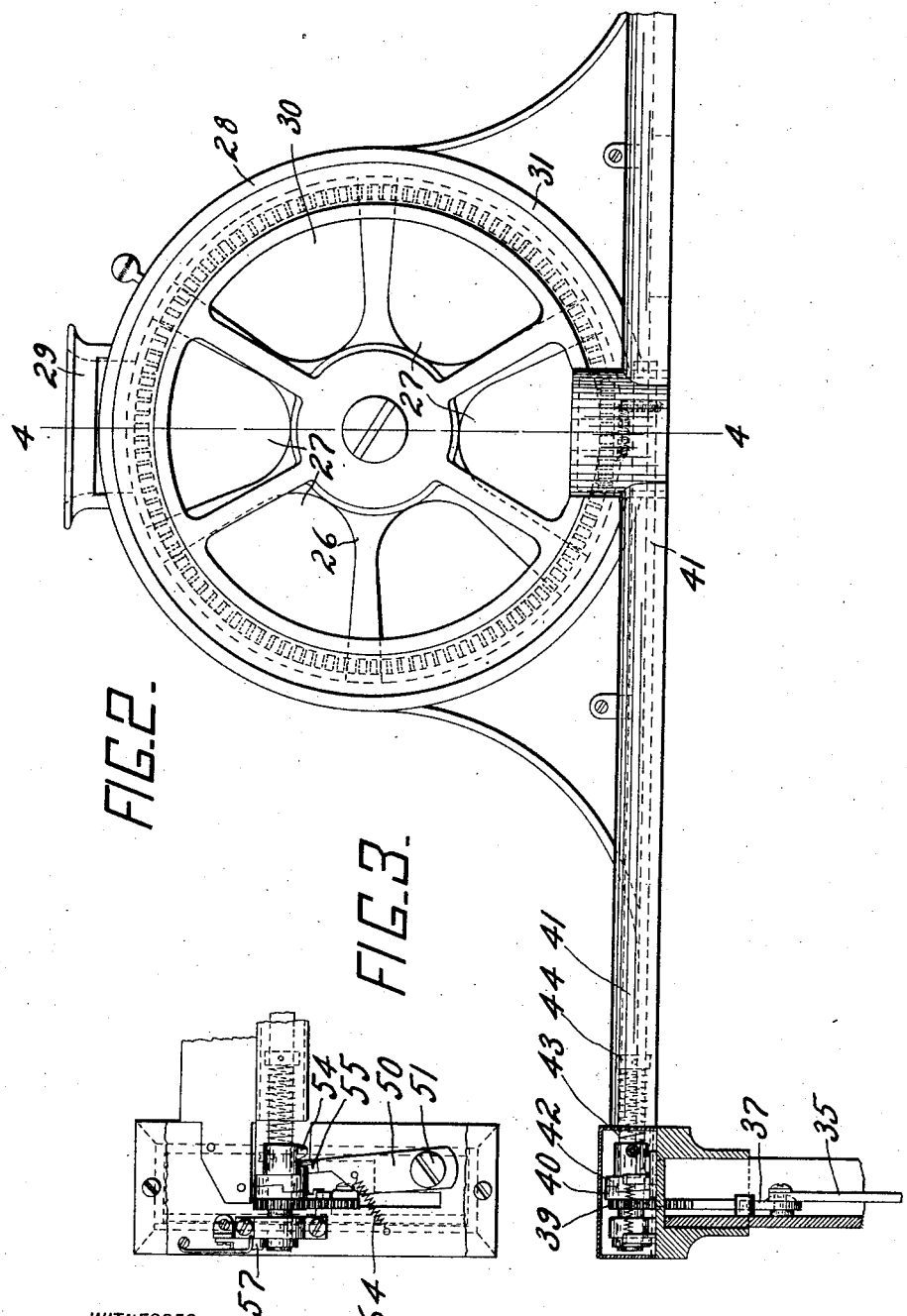

C. PALMER.
CASH REGISTER.
APPLICATION FILED MAR. 28, 1910.
1,046,011.
Patented Dec. 3, 1912.
3 SHEETS—SHEET 3.
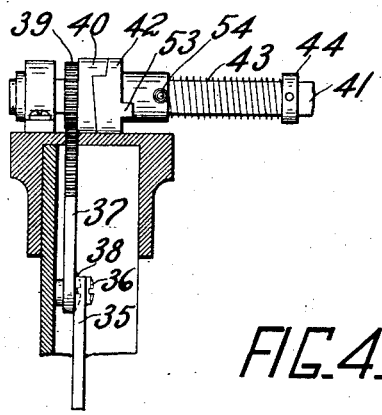
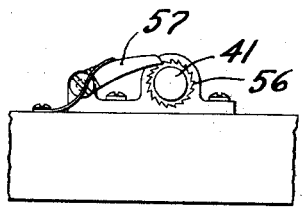
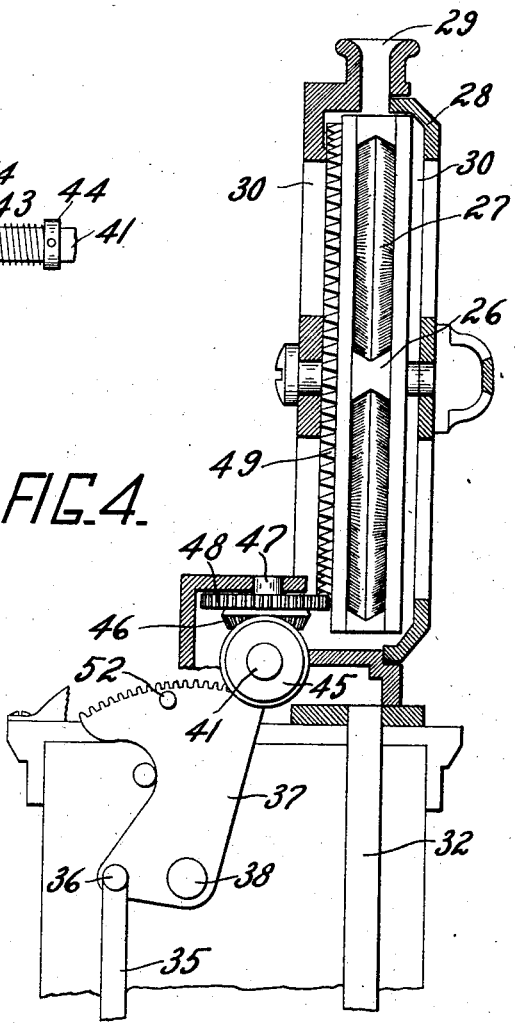
WITNESSES:
INVENTOR
Charles Palmer
BY
ATTORNEYS

UNITED STATES PATENT OFFICE.

CHARLES PALMER, OF LONDON, ENGLAND, ASSIGNOR TO THE NATIONAL CASH REGISTER COMPANY, OF DAYTON, OHIO, A CORPORATION OF OHIO, (INCORPORATED IN 1906.)

CASH-REGISTER.

1,046,011.     Specification of Letters Patent.     Patented Dec. 3, 1912.

Application filed March 28, 1910. Serial No. 552,049.

*To all whom it may concern:*

Be it known that I, CHARLES PALMER, a subject of the King of Great Britain and Ireland, residing at London, in the county of Middlesex, England, have invented certain new and useful Improvements in Cash-Registers, of which I declare the following to be a full, clear, and exact description.

This invention relates to cash registers and has more particular relation to that class of registers provided with coin displaying mechanism for displaying the coins received as payment for purchases for which the machine is operated to record.

The primary object of the present invention is to provide a coin displaying mechanism of simple construction and convenient in form and location.

Another object of the invention is to so locate the displaying mechanism with relation to the indicating mechanism to enable one to see at a single glance the amount of the transaction as recorded in the machine and indicated by the indicating mechanism and the amount tendered by the customer as shown by the coins received which are exhibited by the coin displaying mechanism.

The invention has been shown as applied to a cash register of the type shown and described in Letters Patent of the United States issued to Thomas Carney on September 6, 1892 and numbered 482,161, but it will readily be seen that the invention may equally as well be applied to any other form of cash registering machines.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Of said drawings: Figure 1 is a side view of the present improvements applied to a machine of the type mentioned. Fig. 2 is a front view of the present invention, portions of the cabinet being removed to disclose the operating mechanism therefor. Fig. 3 is a top plan view of the left hand end of Fig. 2. Fig. 4 is an enlarged sectional view looking to the left from lines 4—4 of Fig. 2. Fig. 5 is an enlarged detail view of the left hand end of Fig. 2. Fig. 6 is a detail view of a retaining mechanism for the operating shaft of the displaying mechanism.

The operation of the machine to which the present improvements are applied is substantially the same as that shown and described in the above mentioned Letters Patent but for convenience may be briefly described as follows: The machine comprises a series of operating keys 20 pivotally mounted on a transverse shaft 21 hung between the side frames 22. Each key 20 is adapted when operated to raise and lower a key coupler mechanism 23 of well known form. The key coupler 23 is pivotally mounted in side frames 22 and extends above all the keys 20 to the rear of the shaft 21. Mounted to rest on the rear end of each of the keys 20 are a series of standards 24 each of which carries at its upper end a "flag" 25 of well known form and adapted to indicate the amount registered at an operation of its appropriate key. At an operation of one of the keys 20 its appropriate indication flag, 25, will be raised and held in such position to expose to view through a suitable opening in the cabinet (not shown), the numerals carried thereby.

The coin displaying mechanism of the present invention is arranged at the top of the machine just above the sight opening for the indicators. It consists of a wheel 26, adapted to be rotated in a manner hereinafter described, said wheel being formed with a series of pockets 27 and being inclosed in a suitable casing 28, which casing is provided with an opening 29 through which coins tendered for purchase may be dropped into the pockets 27 of said wheel 26. The casing is further provided with glass sides 30 through which coins dropped in the pockets of the wheel may be viewed by both the customer and operator until they reach a point 31 when they will drop from the containing pocket into a chute 32 and pass down through said chute 32 into a receptacle 33 located in the base of the machine.

The mechanism for rotating the wheel 26 will now be described.

Pivotally connected by a pin 34 to coupler 23 (see Fig. 1) is a link 35 the upper end of which is pivotally connected by a pin 36 to a rack segment 37 which segment 37 is pivoted at 38 to the side frame. The teeth of segment 37 mesh with a small pinion 39 mounted on the side of a clutch member 40 of a one way acting clutch, said pinion and clutch member being mounted to turn loosely on a drive shaft 41 extending transversely of the top of the machine and said pinion 39 and clutch member 40 being adapted to be given a complete backward and forward rotation at each reciprocation of coupler 23 and consequent rocking of segment 37. The clutch member 40 coöperates with a second clutch member 42, of the one way acting clutch to rotate the shaft. The clutch member 42 is splined on the shaft 41 and is spring pressed toward a position of engagement with clutch member 40 by a spring 43 interposed between said clutch member 42 and a collar 44 rigidly mounted on said shaft 41.

Fig. 5 shows the normal position of the parts just described and it will readily be seen that upon a complete forward rotation of pinion 39 and clutch member 40, the clutch member 42 and shaft 41 will also be given a complete forward rotation. At the backward rotation of pinion 39 and clutch member 40 the member 42 will be forced to the right until member 40 is again in normal position, when clutch member 42 will again spring into operative engagement with member 40.

Rigidly mounted near the right hand end of shaft 41 is a small bevel gear 45 meshing with a similar gear 46 rigidly mounted on a stub shaft 47 which shaft also has rigidly mounted thereon a small gear 48 the teeth of which are constantly in mesh with crown teeth 49 formed on the outer edge of the forward side of wheel 26. The gearing just described is so timed that a single rotation of shaft 41 will result in a movement of wheel 26 equal in extent to the angle of one of the pockets 27, thus presenting an empty pocket at opening 29 at the end of each operation of the machine.

To prevent an excessive movement of shaft 41 and a consequent excessive movement of wheel 26, a plate 50 is provided pivoted at 51 to the cabinet frame (see Figs. 2, 3 and 5). The plate 50 is normally drawn toward the left by a spring 64 (Fig. 3) but is restrained from such movement by a pin 52 carried by segment 37. Shortly after said segment starts upon its rearward movement the pin 52 will pass away from the plate 50 and thereby permit the forward end thereof to move into the path of a lug 53 formed on clutch member 42 of the clutch. Upon the completion of a single rotation of the shaft 41 the lug 53 will strike said plate 50 and thereby arrest the movement of the shaft. When the segment 37 is restored to normal position the pin 52 will again engage the plate 50 and restore said plate to normal position. In case the spring 64 should for some reason fail in the performance of its function a round head stud 54 also carried by clutch member 42 will engage a bevel 55 formed on the outer end of plate 50 and thereby positively move said plate to engaging position.

In order to prevent any backward rotation of shaft 41 a retaining mechanism such as shown in Fig. 6 may be provided, such mechanism consisting of a ratchet 56 rigidly mounted on the end of said shaft and coöperating with a spring pressed pawl 57 mounted on the main frame of the machine.

The general operation of the machine is as follows: When a purchase is made and coins are tendered in payment thereof, the coins thus tendered are inserted in the displayer through the receiving opening and are received in the pocket of the display wheel which stands just below the opening. At an operation of amount keys representing the amount of purchase the display wheel is rotated through the medium of the mechanism above described to an extent sufficient to cause the coin containing pocket to move away from the receiving opening and the next empty pocket to the right to assume a position just below said opening. The coins received are thus displayed through the glass sides of the displayer casing and as said displayer is located just above the sight opening through which the indicators, representing the amount of purchase may be viewed, it serves as a check on the operator. In case of any dispute as to correctness of the amount of change, the amount tendered may plainly be seen by both customer and proprietor or clerk, as well as the amount of purchase as represented by the indicators displayed. By watching the displayer the customer may note whether or no the operator places the full amount tendered into the machine. As the coin passes down into a locked receptacle in the case of the machine, stealing of any money by the operator is thus prevented.

While the form of mechanism herein shown and described is admirably adapted to fulfil the objects primarily stated it is not intended to confine the invention to the one form of embodiment herein shown and described, for it is susceptible of embodiment in various forms all coming within the scope of the claims which follow.

What is claimed is as follows:

1. In a machine of the class described, the combination with a manipulative device, of a gear segment oscillated thereby and carrying a projection, a rotatable coin displayer having a plurality of pockets, a shaft having gear connections to said displayer, a gear pinion meshing with said segment and mounted loosely on said shaft, a one way acting clutch connecting said pinion to said shaft, and having a projecting pin and a shoulder, and a pivoted arm positioned to be engaged by said projecting pin and said shoulder in succession, and to be operated by said projection.

2. In a machine of the class described, the combination with a coin displayer having a plurality of coin pockets, of mechanism, including a clutch member having a projecting pin and a shoulder, connected to give said displayer one direction movements only, an oscillating gear segment bearing a projection, and connected to said clutch member, and a pivoted arm positioned to be engaged by said projecting pin and said shoulder in succession, and to be operated by said projection.

3. In a cash register, the combination with value keys, and value indicators, and a key coupler operated by said keys, of a coin displayer positioned adjacent said value indicators and comprising a cylindrical receptacle having radial ribs, and provided with crown gear teeth, a bevel gear having connections to drive said crown gear teeth, a shaft to which said bevel gear is fast, a clutch, comprising two relatively movable members, one of which is mounted on said shaft to rotate therewith, a segment gear connected to drive the other of said clutch members, and a link connecting said segment gear to the key coupler, a cash drawer and a chute extending from the lower edge of said cylindrical receptacle to the cash drawer.

In testimony whereof I affix my signature in the presence of two witnesses.

CHARLES PALMER.

Witnesses:
A. E. MELHUISH,
W. E. BROWN.

Copies of this patent may be obtained for five cents each, by addressing the "Commissioner of Patents, Washington, D. C."